United States Patent
Mahadeo et al.

(10) Patent No.: US 11,655,837 B2
(45) Date of Patent: May 23, 2023

(54) ANCHOR ASSEMBLY WITH TOGGLE

(71) Applicant: THE HILLMAN GROUP, INC., Cincinnati, OH (US)

(72) Inventors: Beesham Mahadeo, Toronto (CA); Michael Martin Hicks, Gilbert, AZ (US)

(73) Assignee: Tlie Hillman Group, Inc., Cincinnati, OH (US)

( * ) Notice: Subject to any disclaimer, the term of this patent is extended or adjusted under 35 U.S.C. 154(b) by 144 days.

(21) Appl. No.: 16/694,227

(22) Filed: Nov. 25, 2019

(65) Prior Publication Data

US 2020/0173478 A1  Jun. 4, 2020

Related U.S. Application Data

(60) Provisional application No. 62/772,949, filed on Nov. 29, 2018.

(51) Int. Cl.
*F16B 13/08* (2006.01)
*F16B 13/00* (2006.01)
*F16M 13/02* (2006.01)

(52) U.S. Cl.
CPC ........... *F16B 13/003* (2013.01); *F16M 13/02* (2013.01)

(58) Field of Classification Search
CPC .......................... F16B 13/0808; F16B 13/002
USPC .............................. 411/29–31, 340, 344–346
See application file for complete search history.

(56) References Cited

U.S. PATENT DOCUMENTS

| | | | |
|---|---|---|---|
| 549,069 A | 10/1895 | Lever | |
| 918,063 A | 4/1909 | Klahre | |
| 991,427 A | 5/1911 | Clements | |
| 1,084,284 A | 1/1914 | Merrill | |
| 1,145,423 A | 7/1915 | Joseph | |
| 1,352,919 A | 9/1920 | Mahoney | |
| 1,373,188 A | 3/1921 | Goewey | |
| 1,386,202 A | 8/1921 | Peterson | |
| 1,409,626 A | 3/1922 | Walther | |
| 1,516,242 A | 11/1924 | Peirce | |
| 1,733,693 A | 10/1929 | Porter | |

(Continued)

FOREIGN PATENT DOCUMENTS

| WO | WO2017055060 | 4/2017 |
|---|---|---|
| WO | WO2017177256 | 10/2017 |
| WO | WO2018102902 | 6/2018 |

OTHER PUBLICATIONS

U.S. Appl. No. 16/694,234.

*Primary Examiner* — Flemming Saether
(74) *Attorney, Agent, or Firm* — Thompson Hine LLP

(57) ABSTRACT

An anchor assembly for wall installation includes a toggle body that is elongated along an axis, and a strap connected to and extending from the toggle body, wherein the strap includes a main segment that extends in a first direction away from an axis of the toggle body when the strap and toggle body are in an unstressed state, and the main segment is bendable down toward the toggle body such that the main segment extends in a second direction, where the second direction runs more closely to parallel with the axis than does the first direction. A locking sleeve mounted for movement along the strap toward the toggle body. The strap is substantially L-shaped and includes a small segment extending laterally relative to the main segment, wherein the small segment is seated within a recess on the toggle body.

17 Claims, 31 Drawing Sheets

(56) References Cited

U.S. PATENT DOCUMENTS

| | | |
|---|---|---|
| 1,738,133 A | 12/1929 | Anderson |
| 2,203,146 A | 6/1940 | Hexdall |
| 2,519,511 A | 8/1950 | Stelter |
| 2,532,040 A | 11/1950 | Seely |
| 2,916,235 A | 12/1959 | Wilhelm |
| 3,168,850 A | 2/1965 | Tennican |
| 3,248,994 A | 5/1966 | Mortensen |
| 3,605,547 A * | 9/1971 | Millet .................. F16B 37/04 411/344 |
| 3,673,910 A | 7/1972 | Collister |
| 3,707,898 A | 1/1973 | Holly |
| 3,748,697 A * | 7/1973 | Marchese ............ F16L 33/035 24/19 |
| 3,861,267 A | 1/1975 | Collister |
| 3,872,768 A | 3/1975 | Ernst |
| 3,980,329 A | 9/1976 | Coe |
| 4,075,924 A * | 2/1978 | McSherry .......... F16B 13/0808 411/112 |
| 4,196,883 A | 4/1980 | Einhorn |
| 4,283,986 A | 8/1981 | Peterson |
| 4,285,264 A | 8/1981 | Einhorn |
| 4,398,855 A | 8/1983 | Hultquist |
| 4,502,826 A | 3/1985 | Fafard |
| 5,046,693 A | 9/1991 | Browne |
| 5,067,864 A * | 11/1991 | Dewey ................ F16B 13/002 411/344 |
| 5,322,401 A | 6/1994 | Vernet |
| 5,558,479 A * | 9/1996 | McElderry .......... F16B 13/002 411/178 |
| 5,749,687 A | 5/1998 | Kilgore, III |
| 5,876,169 A | 3/1999 | Wrigley |
| 6,161,999 A | 12/2000 | Kaye |
| 6,213,701 B1 | 4/2001 | Ukai |
| 6,250,865 B1 | 6/2001 | McSherry |
| 6,491,486 B1 | 12/2002 | Daly |
| 6,679,664 B2 | 1/2004 | Ikuta |
| 6,821,069 B2 | 11/2004 | Ikuta |
| 6,884,012 B2 | 4/2005 | Panasik |
| 7,547,171 B2 | 6/2009 | McDuff |
| 7,611,316 B2 | 11/2009 | Panasik |
| D605,933 S | 12/2009 | Gaudron |
| 7,736,108 B1 | 6/2010 | Bruce |
| 7,828,501 B2 | 11/2010 | Bauer et al. |
| 7,955,392 B2 | 6/2011 | Dewey |
| 8,011,080 B2 | 9/2011 | Brown |
| D651,890 S | 1/2012 | Gaudron |
| 8,128,329 B2 | 3/2012 | Pilon |
| 8,235,635 B1 | 8/2012 | Brown |
| 8,303,224 B2 | 11/2012 | McDuff |
| 8,388,290 B2 | 3/2013 | Wiggins |
| 8,444,358 B2 | 5/2013 | Gaudron |
| 8,449,236 B2 | 5/2013 | McDuff |
| 8,568,075 B2 | 10/2013 | Gaudron |
| 8,573,913 B2 | 11/2013 | McDuff |
| 8,821,094 B2 | 9/2014 | McDuff |
| 8,858,143 B2 | 10/2014 | Gaudron |
| 9,394,932 B2 | 7/2016 | McDuff |
| 9,447,556 B2 | 9/2016 | Daniel |
| 9,587,661 B2 | 3/2017 | McDuff |
| 10,690,165 B2 * | 6/2020 | Daly .................... F16B 13/0808 |
| 2004/0170486 A1 * | 9/2004 | DeMeo ............... F16B 13/0808 411/340 |
| 2005/0117996 A1 | 6/2005 | Lemire |
| 2006/0088399 A1 | 4/2006 | DeMeo |
| 2009/0053007 A1 | 2/2009 | Rafaeli |
| 2009/0208310 A1 | 8/2009 | Ikuta |
| 2009/0249738 A1 | 10/2009 | Brereton |
| 2011/0164941 A1 | 7/2011 | Snead |
| 2011/0262235 A1 * | 10/2011 | Garfield .............. B23B 51/0081 408/125 |
| 2014/0199132 A1 | 7/2014 | McDuff |
| 2015/0043989 A1 | 2/2015 | Lind |
| 2016/0131304 A1 | 5/2016 | Roberts |
| 2017/0102020 A1 | 4/2017 | McDuff |
| 2017/0307000 A1 | 10/2017 | Daly |
| 2017/0314600 A1 | 11/2017 | Daly |
| 2018/0073538 A1 | 3/2018 | Daly |

\* cited by examiner

ANCHOR ASSEMBLY WITH TOGGLE

TECHNICAL FIELD

This application relates generally to wall anchors for drywall and other types of wallboard, and more particularly, to an anchor assembly with a toggle body and a strap.

BACKGROUND

A variety of types of wall anchors are known, including strap toggles in which a toggle body, a strap and a locking sleeve form an assembly. Improvements in both the manufacturability and performance of such strap toggles is continually sought.

SUMMARY

In one aspect, an anchor assembly for wall installation includes a toggle body that is elongated along an axis, and a strap connected to and extending from the toggle body, wherein the strap includes a main segment that extends in a first direction away from an axis of the toggle body when the strap and toggle body are in an unstressed state, and the main segment is bendable down toward the toggle body such that the main segment extends in a second direction, where the second direction runs more closely to parallel with the axis than does the first direction. A locking sleeve mounted for movement along the strap toward the toggle body. The strap is substantially L-shaped and includes a small segment extending laterally relative to the main segment, wherein the small segment is seated within a recess on the toggle body.

In another aspect, an anchor assembly for wall installation includes a toggle body that is elongated along an axis, and a strap connected to and extending from the toggle body, wherein the strap includes a main segment that is movable between a first orientation extending away from the axis of the toggle body and a second orientation running alongside the toggle body. A locking sleeve is mounted for movement along the strap toward the toggle body. The main segment of the strap and the locking sleeve include a cooperating ratchet feature formed by part spherical recesses along the main segment and a part spherical projection on the locking sleeve that fits within the part spherical recesses.

In a further aspect, an anchor assembly for wall installation includes a toggle body that is elongated along an axis, and a strap connected to and extending from the toggle body, wherein the strap includes a main segment that is movable between a first orientation extending away from the axis of the toggle body and a second orientation running alongside the toggle body. A locking sleeve is mounted for movement along the strap toward the toggle body. The toggle body includes a substantially flat side with a thumb recess formed therein and a arcuate side with a finger recess formed therein, where the finger recess and the thumb recess are aligned along the axis of the toggle body.

In yet another aspect, an anchor assembly for wall installation includes a toggle body that is elongated along an axis, and a strap connected to and extending from the toggle body, wherein the strap includes a main segment that is movable between a first orientation extending away from the axis of the toggle body and a second orientation running alongside the toggle body. A locking sleeve is mounted for movement along the strap toward the toggle body. The anchor assembly further includes one or more features selected from the following:

(i) the strap is L-shaped and includes a small segment that is seated within a recess on a flat side of the toggle body; or
(ii) the strap is L-shaped and includes a small segment that is slidingly engaged into a recess on a flat side of the toggle body, where the recess includes a portion with a retaining profile and the small segment includes a mating retaining profile; or
(iii) the strap is L-shaped and includes a small segment that is slidingly engaged into a recess on a flat side of the toggle body, where the recess includes a portion with a dovetail profile and the small segment includes a mating dovetail profile, wherein a bottom of the recess includes an opening into which a projection on the bottom of the small segment of the strap snaps to prevent the small segment from sliding out of the recess; or
(iv) the main segment of the strap and the locking sleeve include a cooperating ratchet feature formed by part spherical recesses along the main segment and a part spherical projection on the locking sleeve that sits within the part spherical recesses; or
(v) the main segment of the strap and the locking sleeve include a cooperating ratchet feature formed by part spherical recesses along the main segment and a part spherical projection on the locking sleeve that sits within the part spherical recesses, where a side of each recess facing toward the toggle body is formed by a substantially planar step and the projection includes a substantially planar step surface facing away from the toggle body, and the projection is formed on a flex tab of the locking sleeve; or
(vi) the toggle body includes flat side with a thumb recess formed therein and a arcuate side with a finger recess formed therein, where the finger recess and the thumb recess are aligned along the axis of the toggle body; or
(vii) the toggle body includes a flat side with a set of spike projections thereon for stabilizing the toggle body against a wall surface; or
(viii) the toggle body includes a wall boring end formed by a positioning tip and a set of blade projections disposed about the positioning tip; or
(ix) the toggle body includes a wall boring end formed by a positioning tip and a set of blade projections disposed about the positioning tip, wherein each blade projection includes a forward cutting edge and a side cutting edge;
(x) the toggle body includes a wall boring end formed by a positioning tip and a set of blade projections disposed about the positioning tip, wherein each blade projection includes a forward cutting edge and a side cutting edge, and a set of pockets are formed between the positioning tip and the blade projections for capture of wall debris; or
(xi) the toggle body includes a wall boring end formed by a positioning tip and a set of blade projections disposed about the positioning tip, wherein the positioning tip is formed by a plurality of stepped segments that are radially spaced apart from each other and that angle toward and meet each when moving toward a free end of the tip.

The details of one or more embodiments are set forth in the accompanying drawings and the description below. Other features, objects, and advantages will be apparent from the description and drawings, and from the claims.

DETAILED DESCRIPTION

Figure 1:
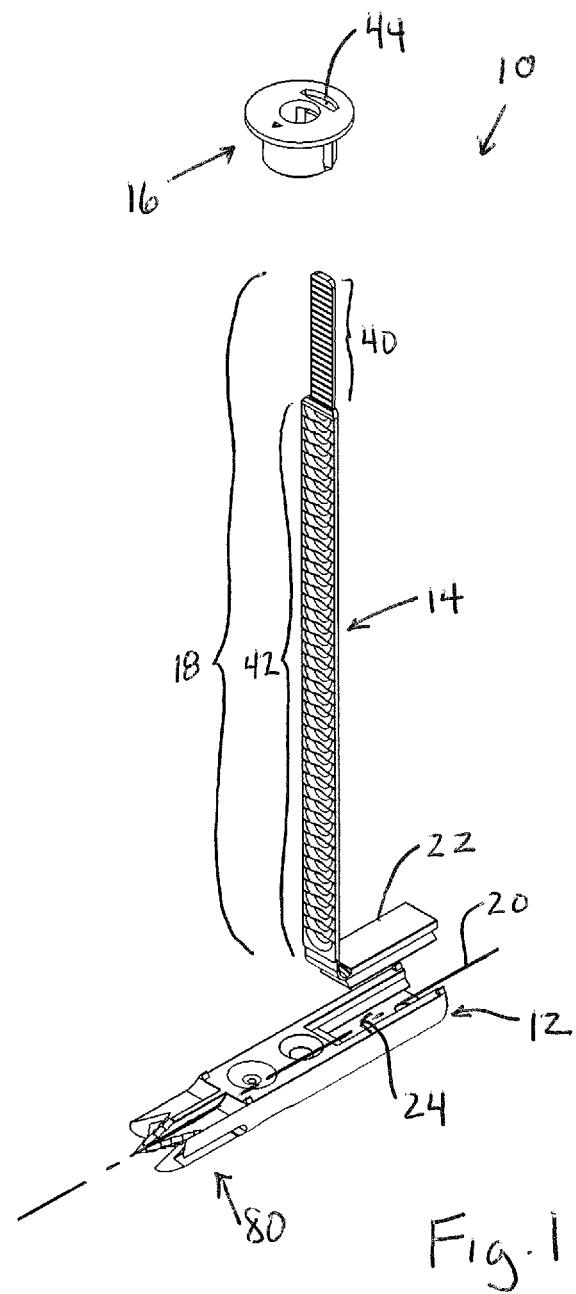
FIGS. 1 and 2 show exploded perspective views of one embodiment of an anchor assembly.
Figure 2:
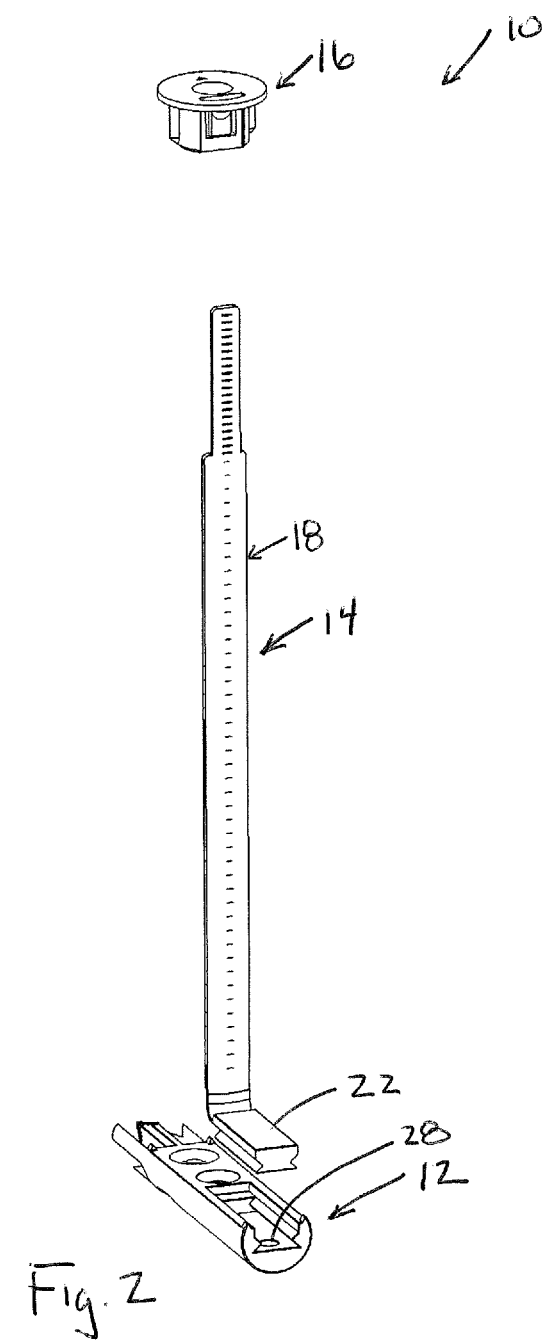
Figure 3:
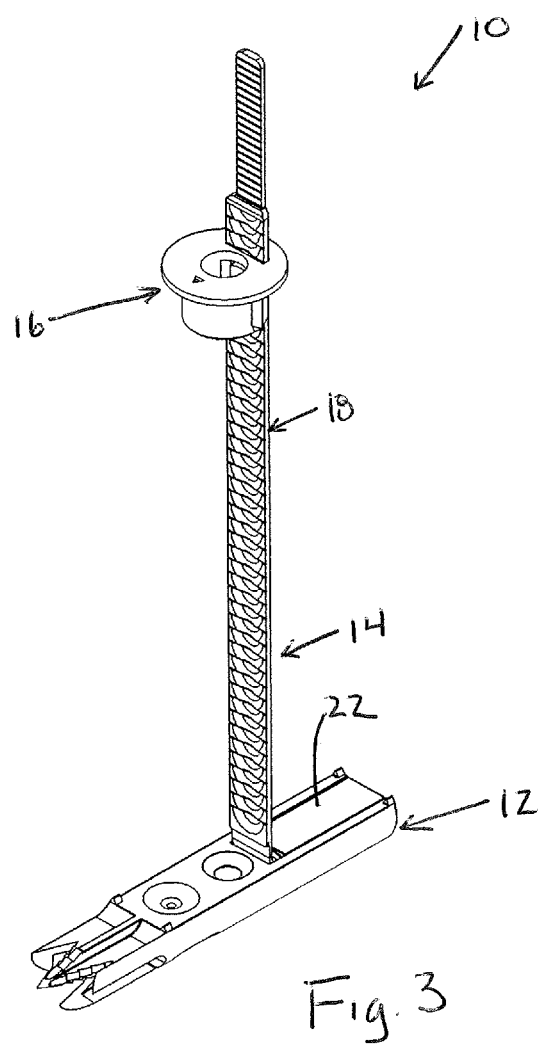
FIG. 3 shows and assembled perspective view of the anchor assembly.
Figure 4:
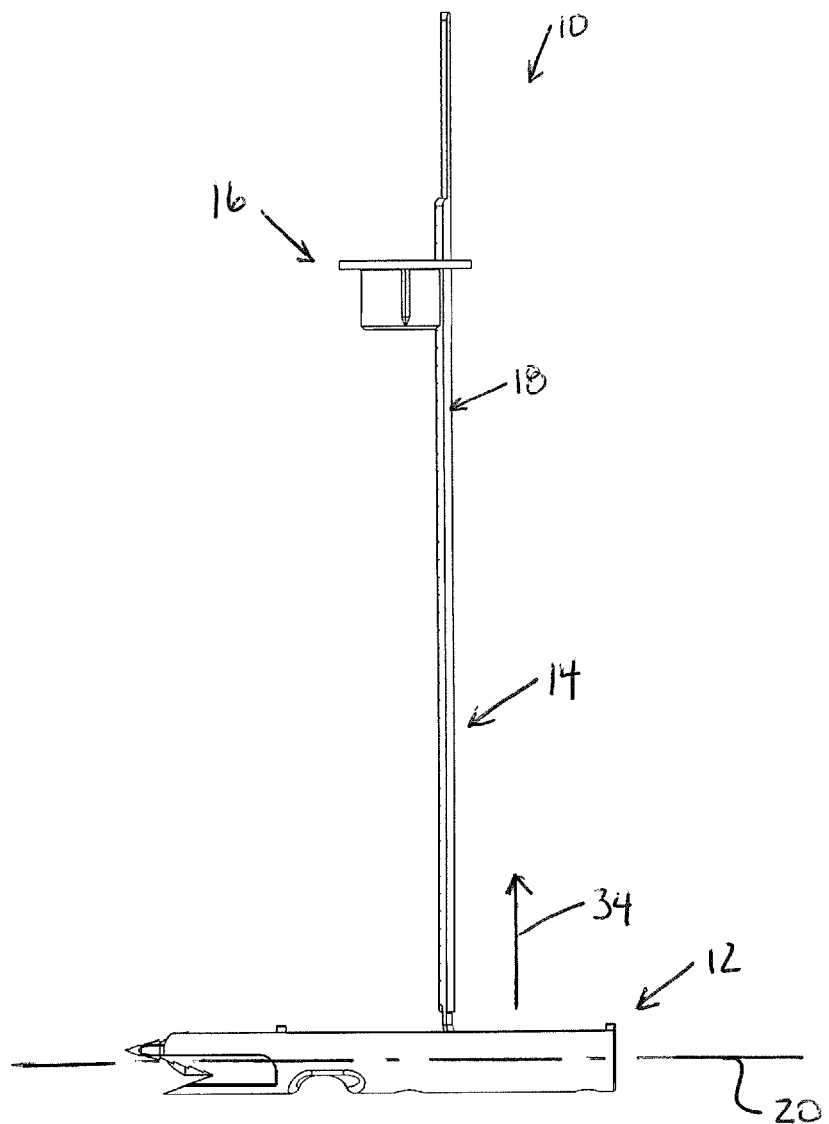
FIG. 4 shows a side elevation of the anchor assembly.
Figure 5:
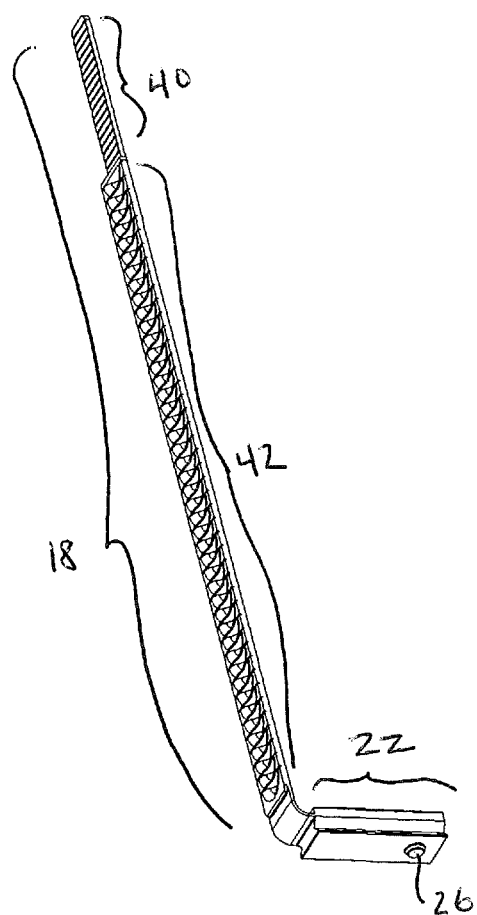
FIG. 5 shows a perspective view of the strap of the anchor assembly.
Figure 6:
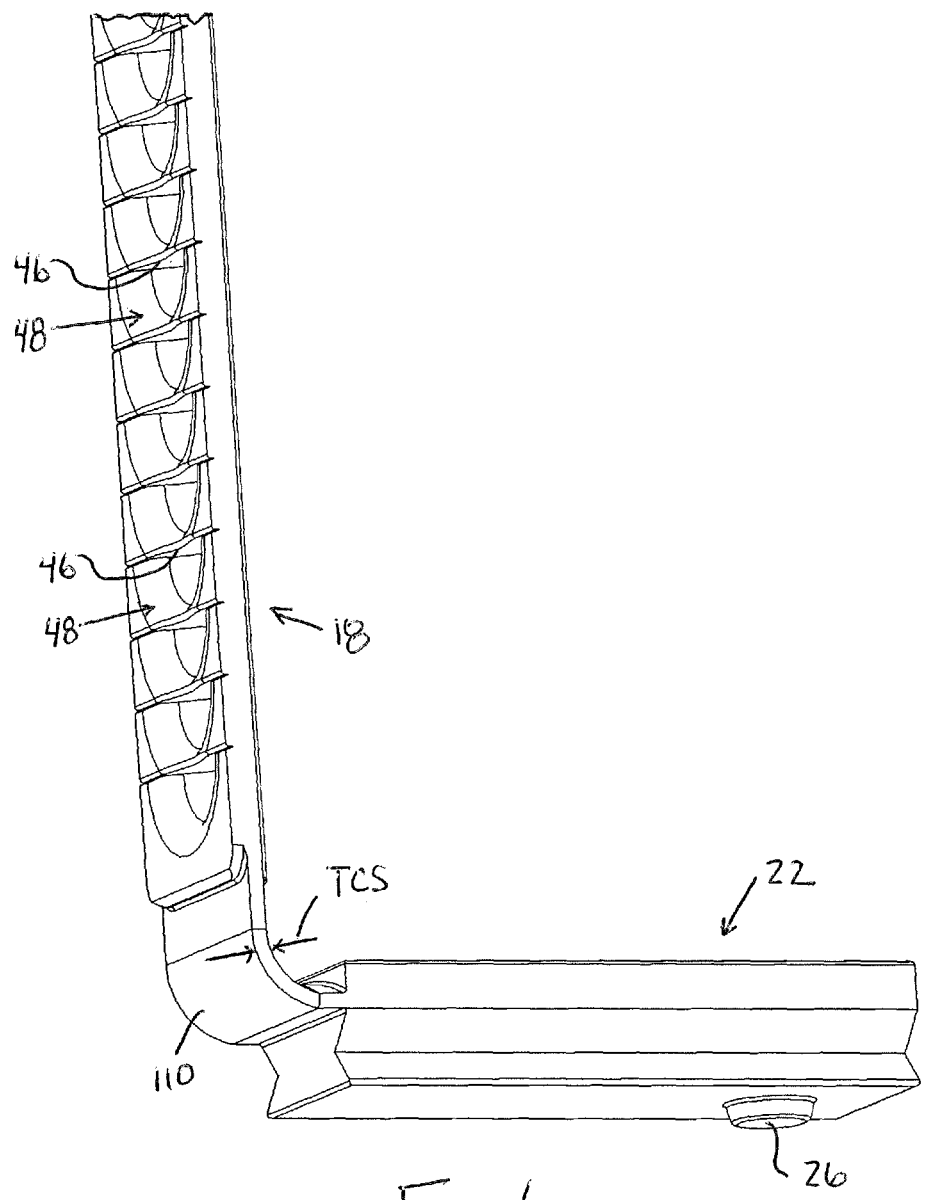
FIGS. 6-9 show perspective views of portions of the strap.
Figure 7:
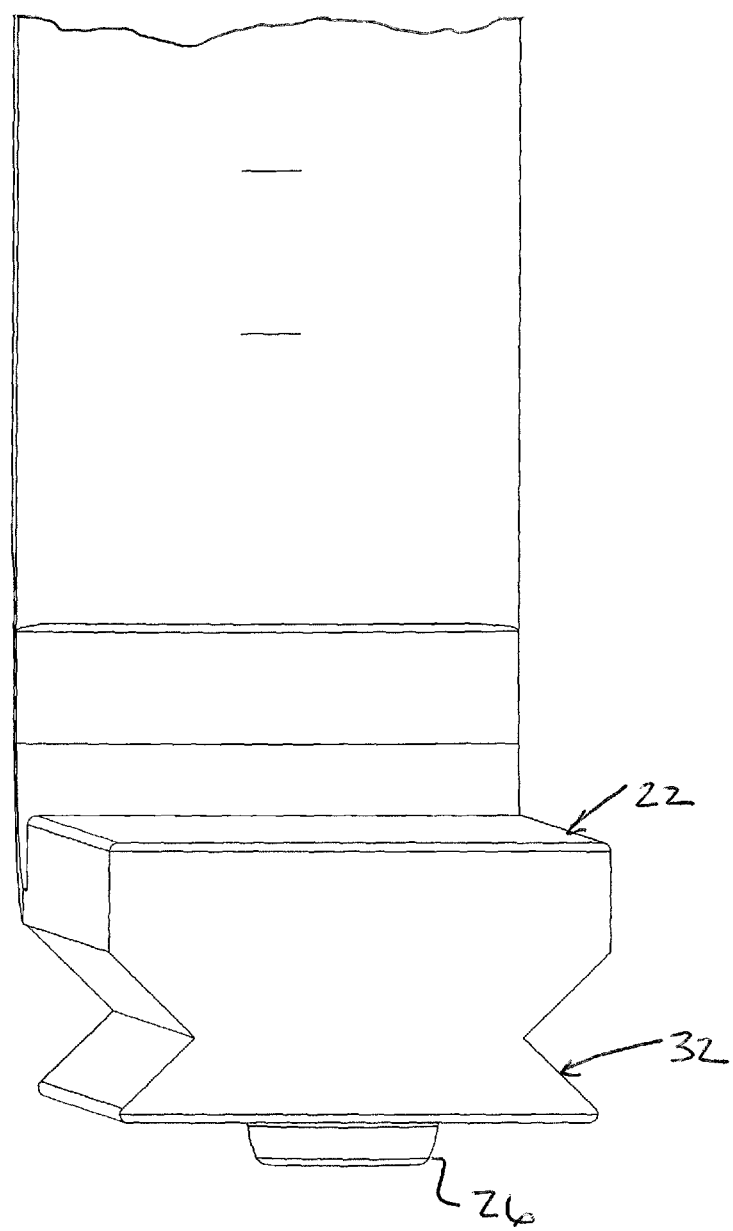
Figure 8:
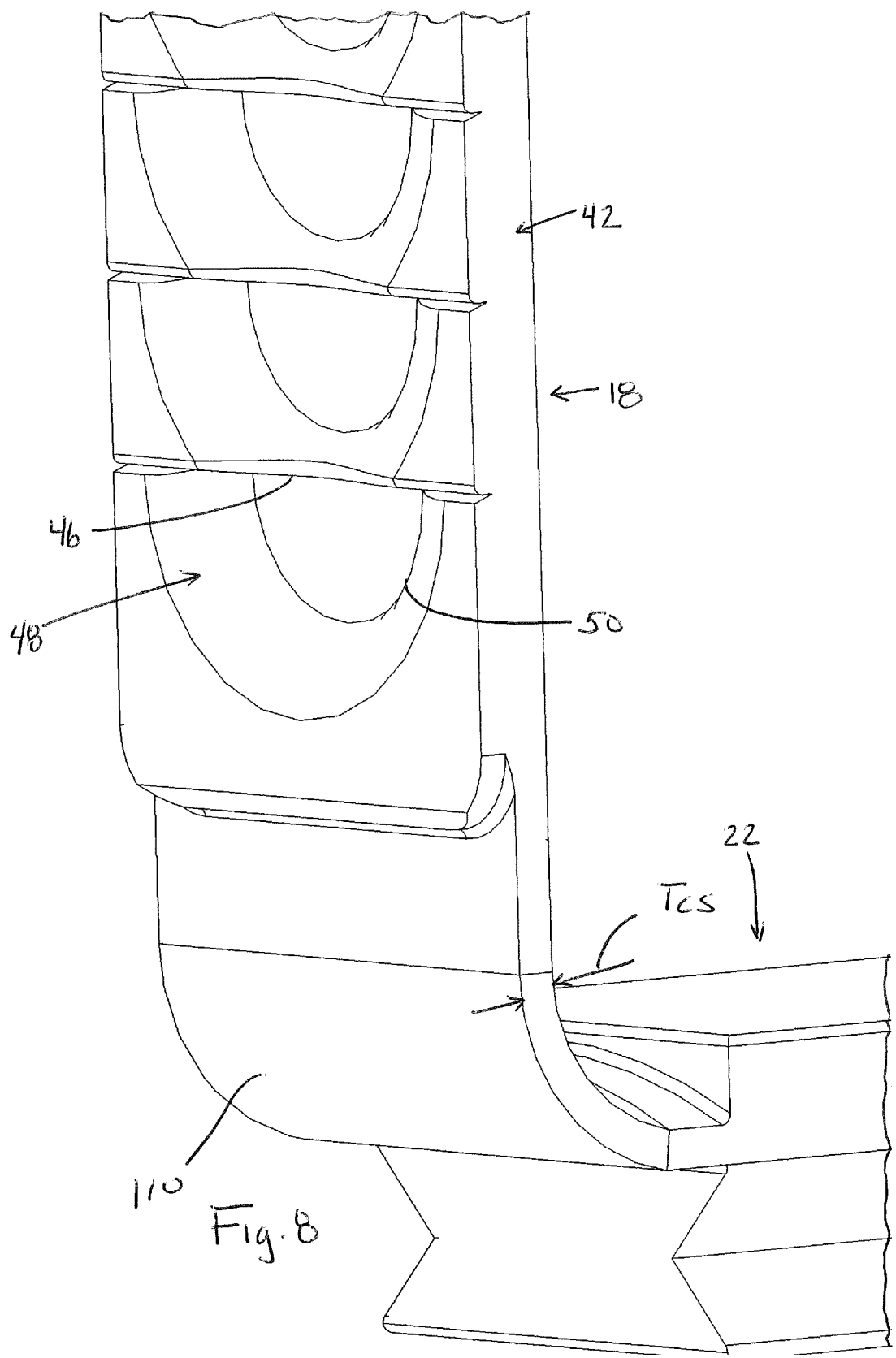
Figure 9:
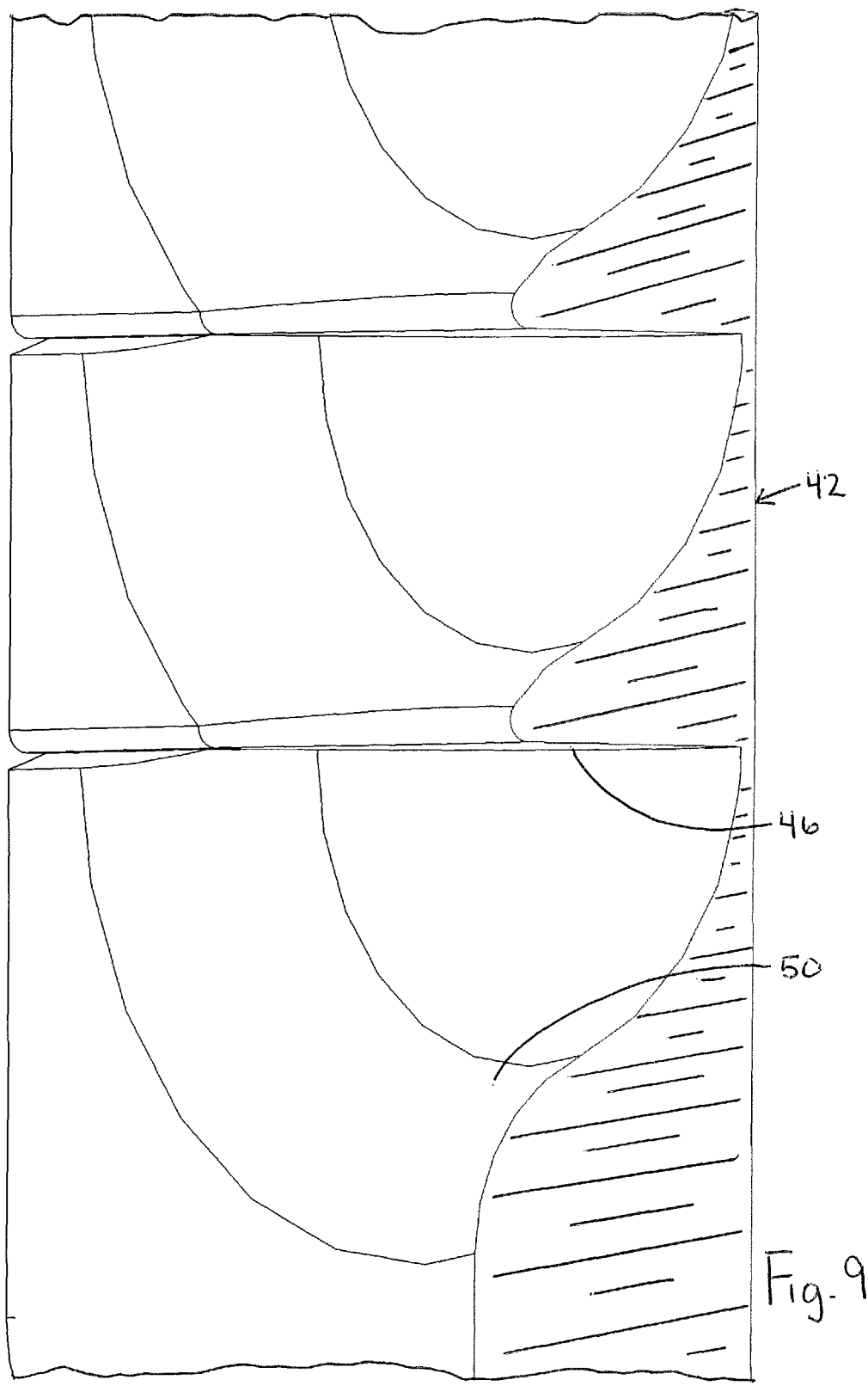
Figure 10:
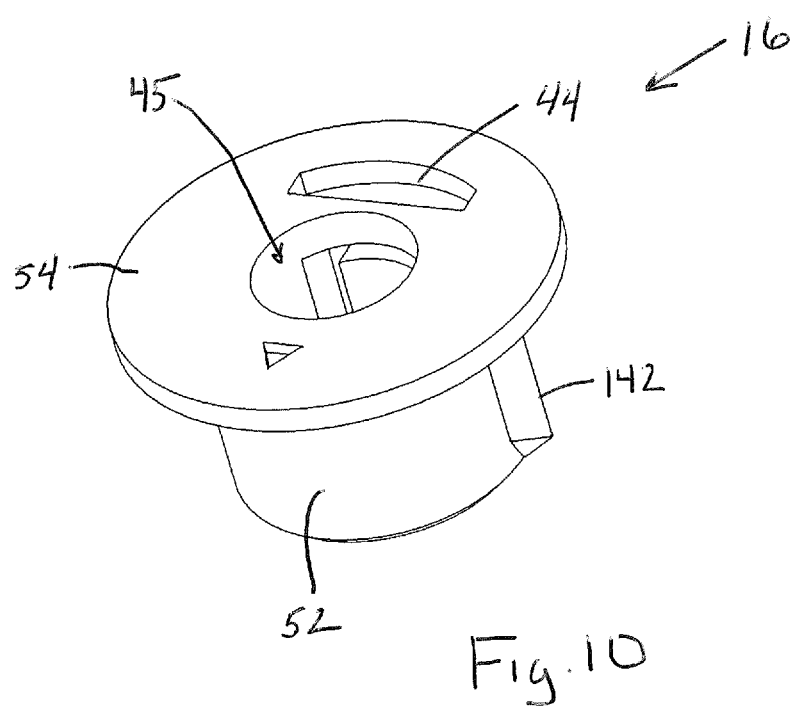
FIG. 10-11 show perspective views of the locking sleeve of the anchor assembly.
Figure 11:
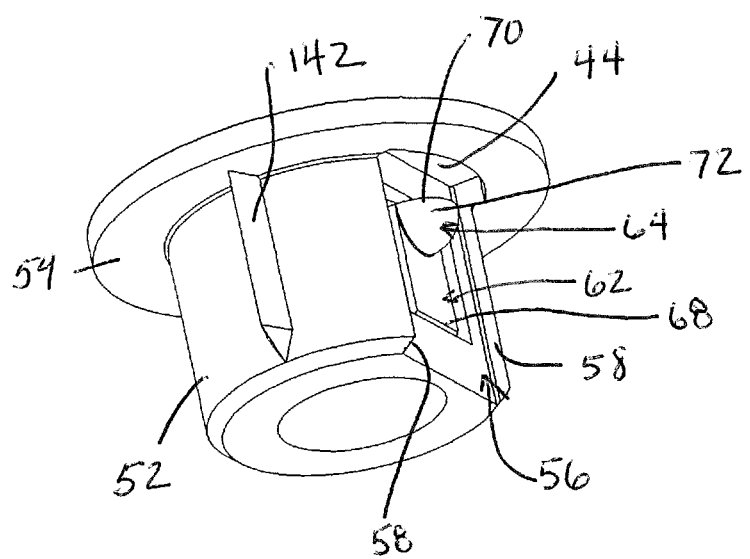
Figure 12:
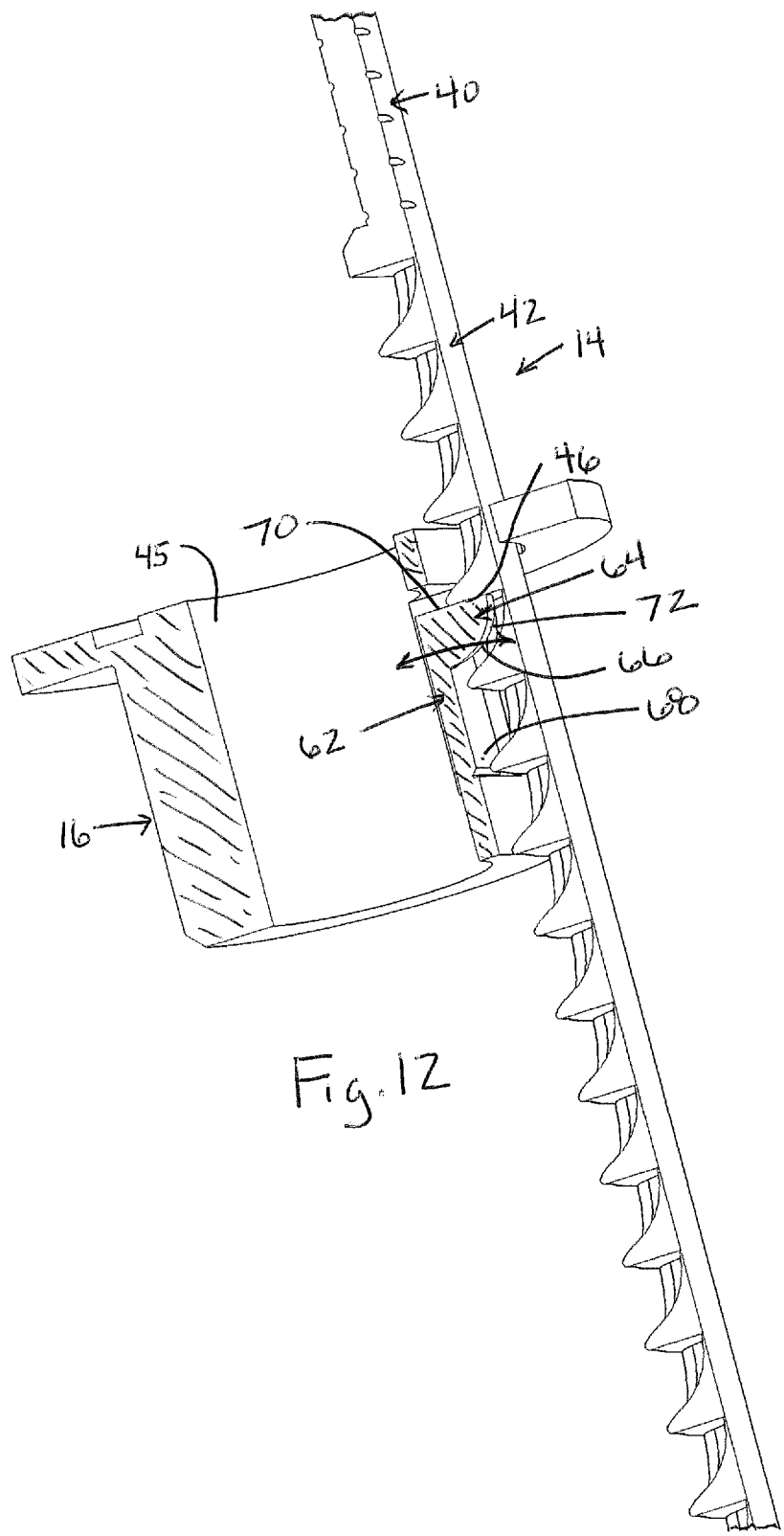
FIG. 12 shows a cross-section of the locking sleeve on the strap.
Figure 13:
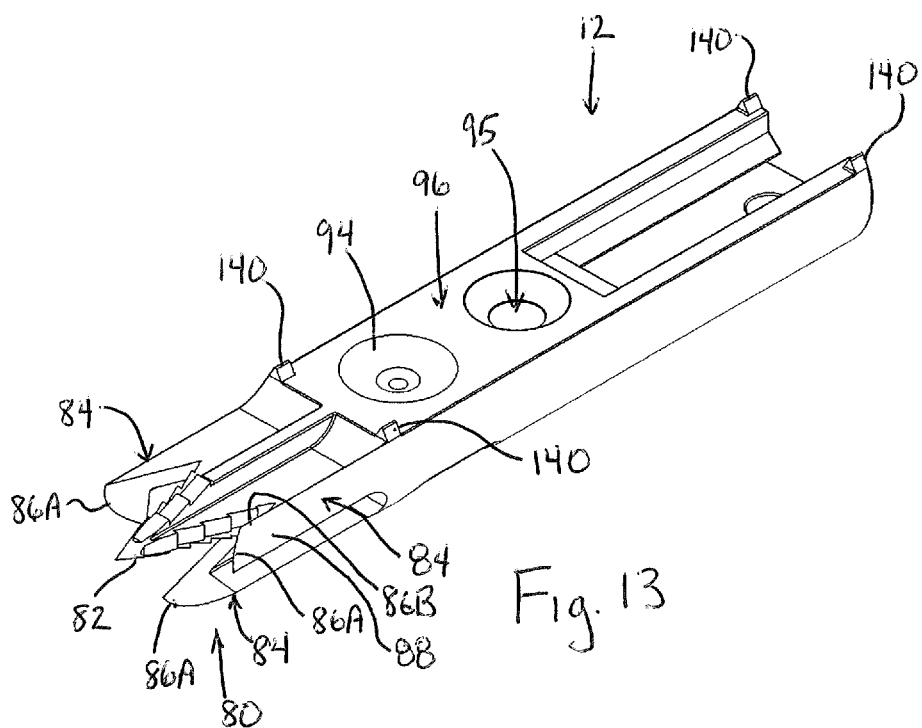
FIGS. 13-16 show perspective views of the toggle body of the anchor assembly.
Figure 14:
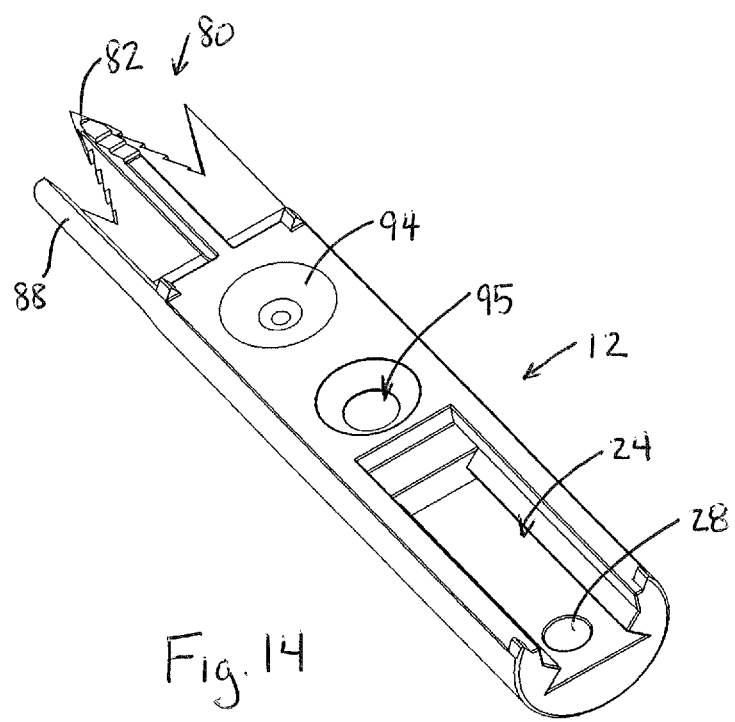
Figure 15:
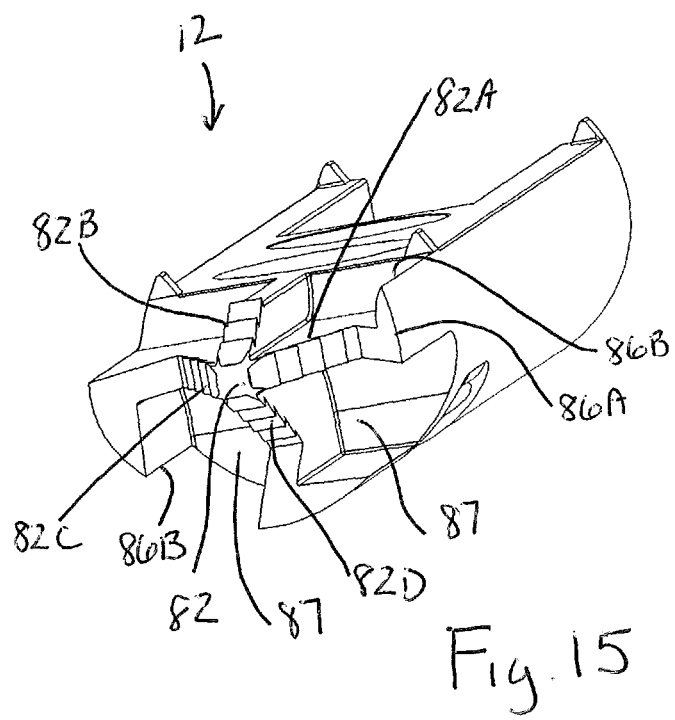
Figure 16:
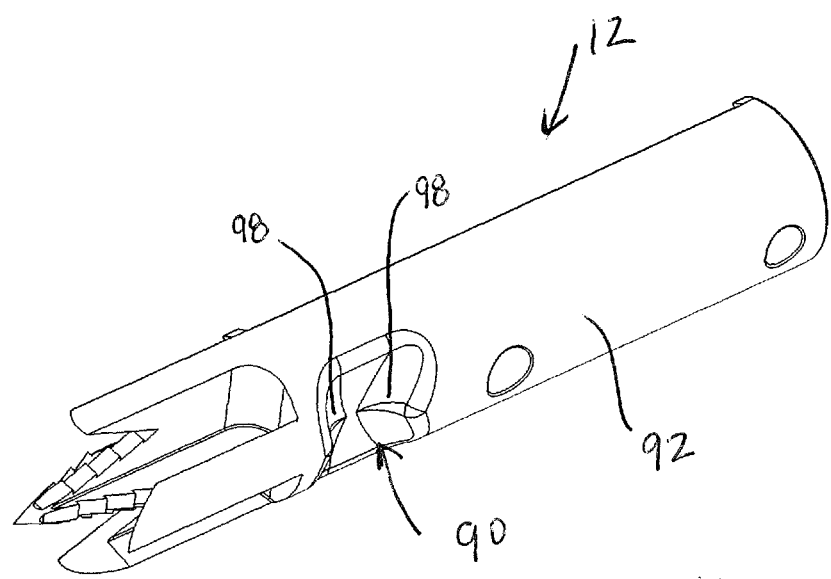
Figure 17:
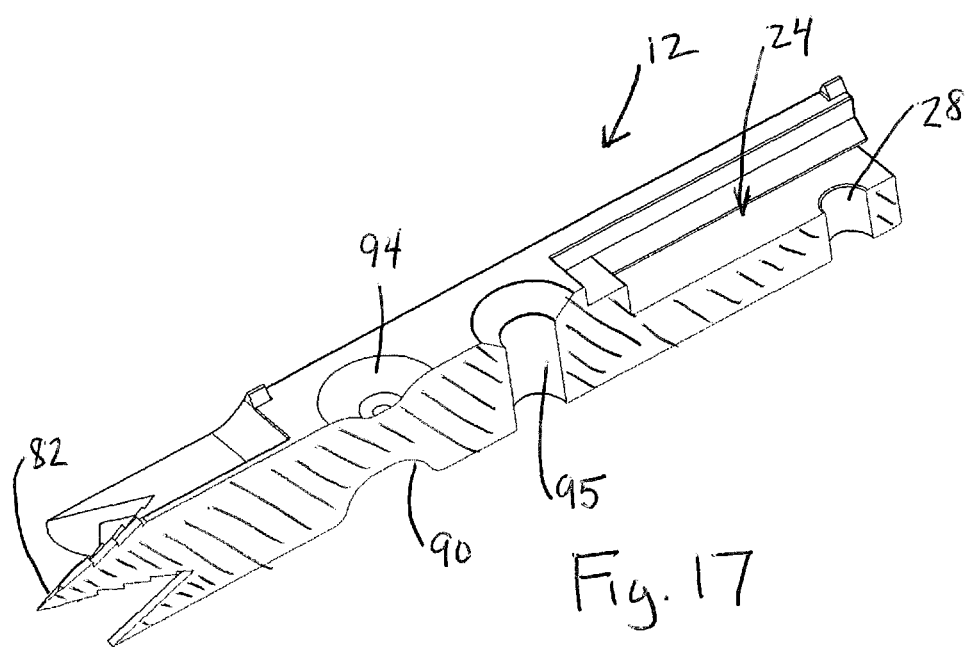
FIG. 17 shows a cross-section of the toggle body.
Figure 18:
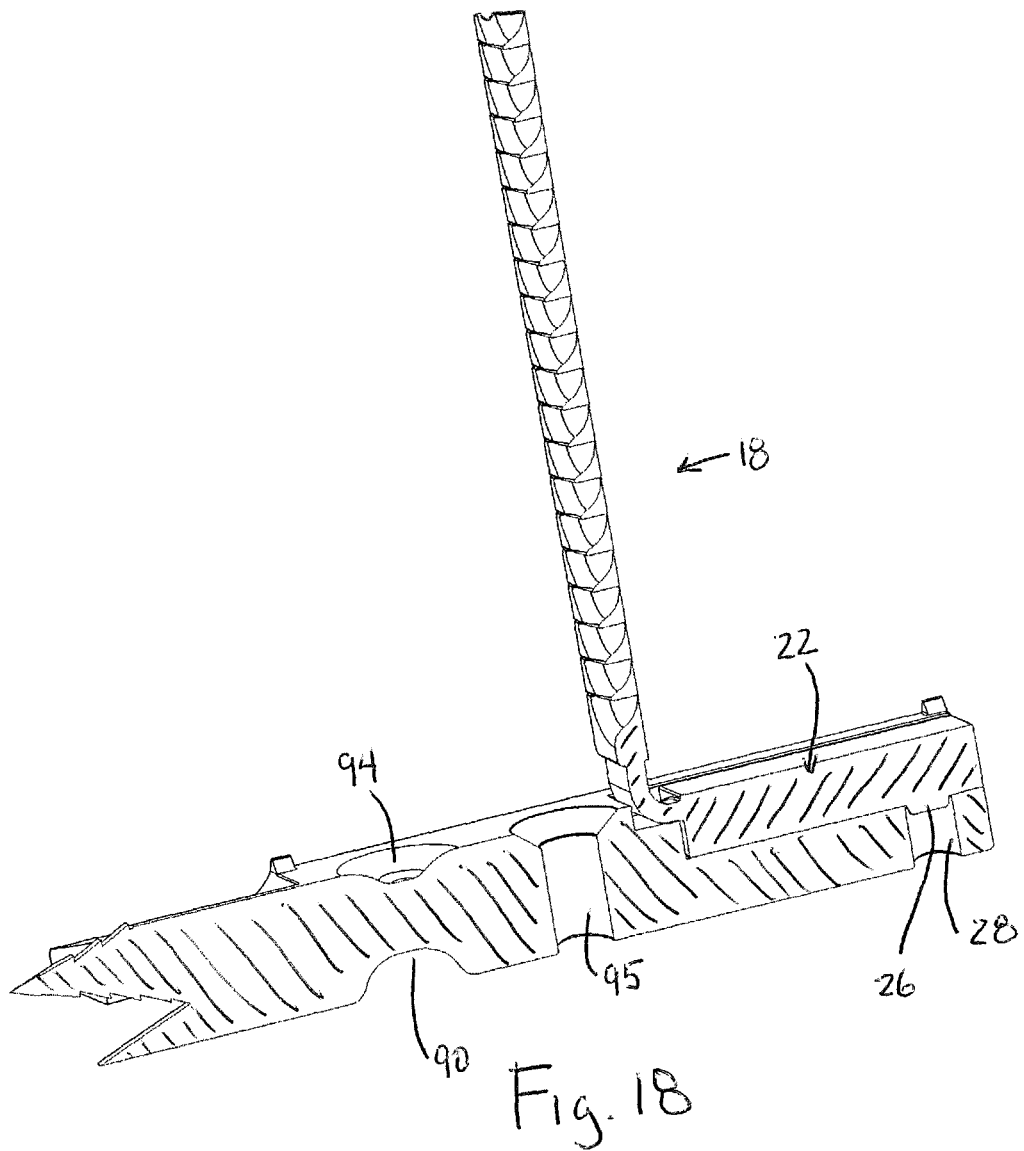
FIG. 18 shows a cross-section of the toggle body with attached strap.
Figure 19:
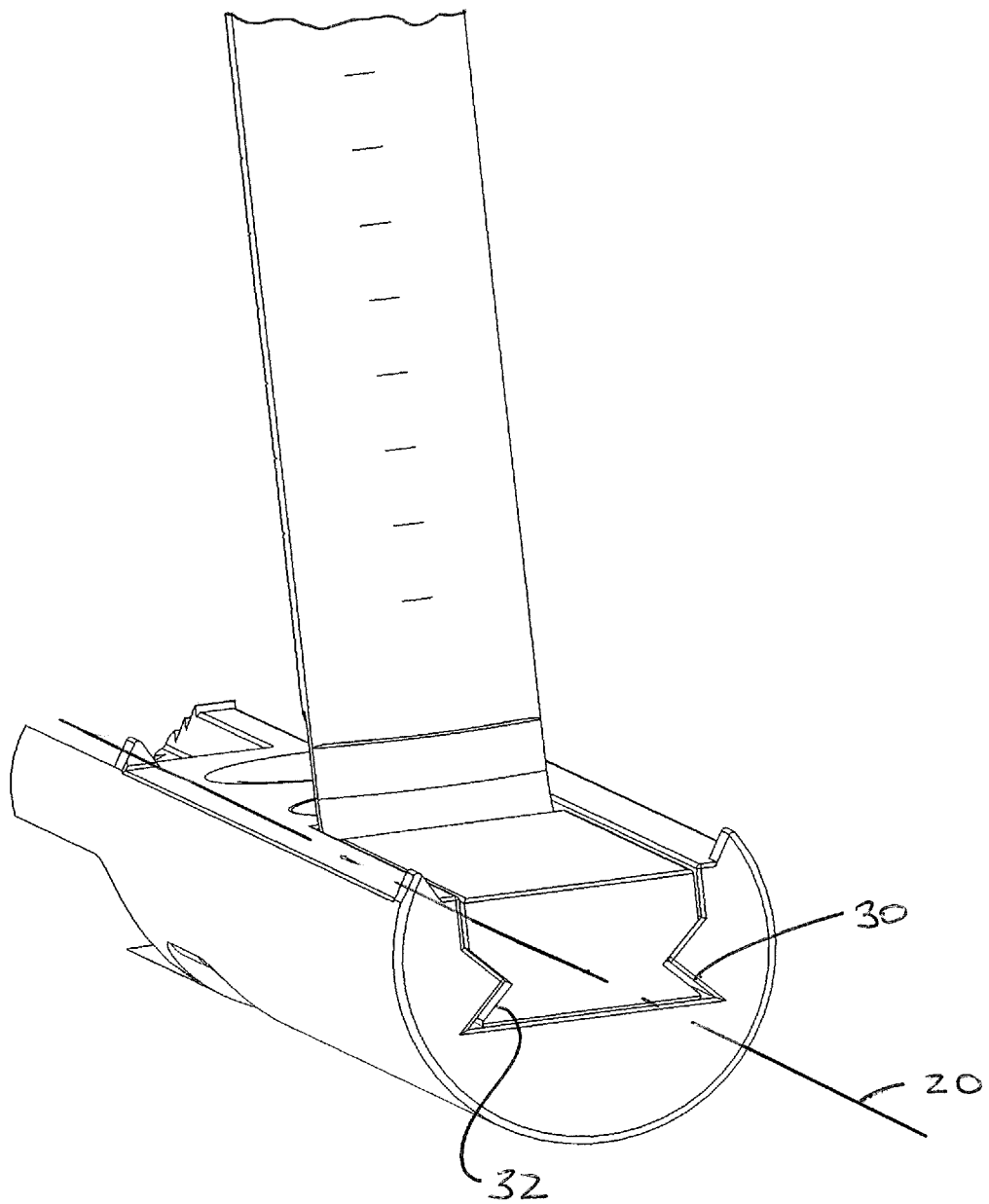
FIG. 19 shows a perspective view of the strap to toggle body connection.
Figure 20:
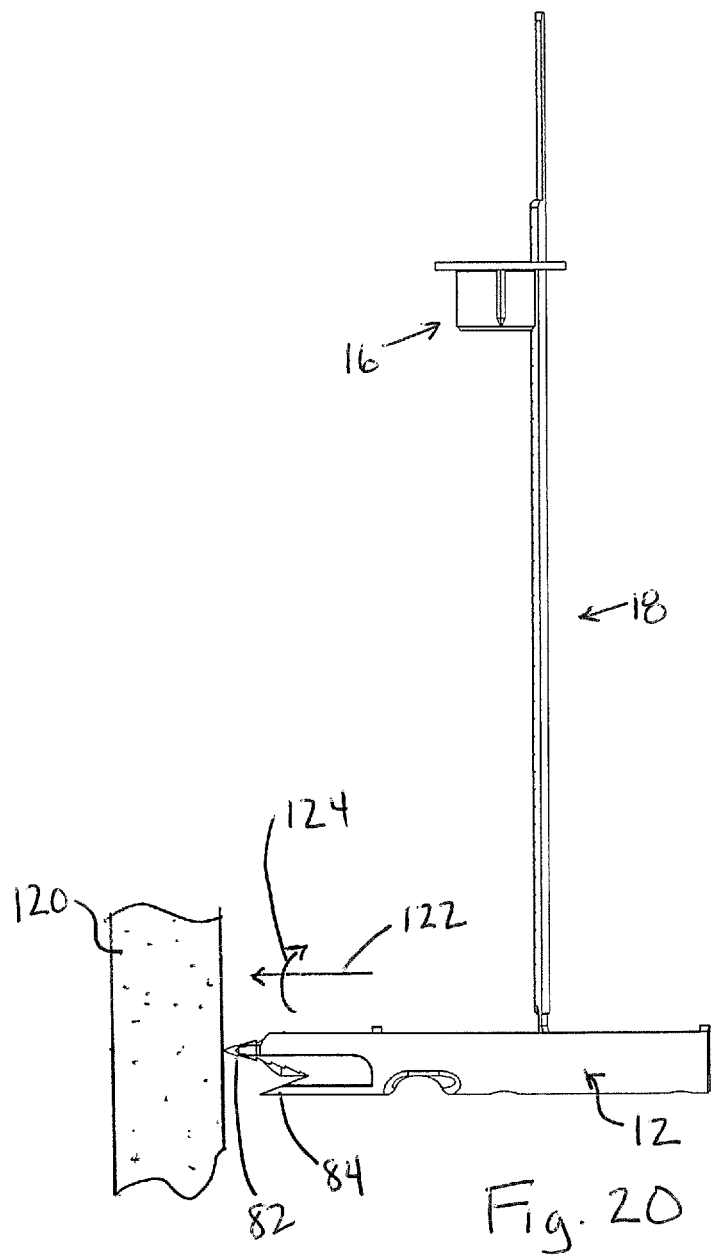
FIGS. 20-28 show side elevation views depicting a sequence of anchor assembly installation on a wall and subsequent object mounting to the anchor.

In the drawings and description of various anchor embodiments below, the term wallboard is generally used to refer to the most common wallboard such as drywall, but it is recognized that the anchor components could be suitable for any other friable wallboard material, such as dense corks or foams or other materials that can crumble. Accordingly, the term wallboard as used herein is intended to broadly encompass, for example, both typical drywall (aka plasterboard and gypsum board) and such other friable wallboard materials.

Referring to FIGS. 1-19, in one embodiment a strap toggle type anchor assembly 10 includes three main portions, specifically a toggle body 12, a strap 14, and a locking sleeve 16. The strap connects to the toggle body and the locking sleeve connects to the strap. In one example, the toggle body 12 is formed of die cast metal material, the strap is formed of plastic material and the locking sleeve 16 is formed of plastic material.

In an unstressed orientation, the strap 14 includes a main segment 18 extending substantially perpendicular to a lengthwise axis 20 of the toggle body, and a small segment 22 that runs parallel to the lengthwise axis 20 of the toggle body and that seats within a recess 24 on the toggle body in order to connect the strap to the toggle body. The underside of the small strap segment 22 in the recess includes a projection 26 that snaps into an opening 28 in the bottom of the toggle body recess 24. The recess 24 has a dovetail shape profile 30 at the bottom (in end profile looking along the axis 20) and the small strap segment 22 includes a corresponding and mating dovetail shape profile 32 at the bottom that enables the small strap segment to slide axially into the recess 24 from the open end of the recess, but prevents the small strap segment from pulling out of the recess in a direction 34 that is transverse to the axis 20. Retaining profiles other than the illustrated dovetail are also possible. For example, the mating retention profiles could be arcuate in shape or T-shaped or any other mating profile shape that provides retention against pull-out in the direction transverse to the axis 20. The projection 26 moves into alignment with and snaps into the opening 28 in the bottom of the recess 24 so as to retain the small strap segment 22 against sliding axially out of the recess after the connection between the strap and the toggle body is made.

The main strap segment 18 is formed with an end portion 40 for gripping and an adjacent locking portion 42 that includes a ratcheting feature that interacts with the locking sleeve (by running through a sleeve passage 44) to hold the locking sleeve in place along the locking portion 42. In particular, the ratcheting feature permits the locking sleeve 16 to slide toward the toggle body 12 but prevents the locking sleeve from sliding away from the toggle body 12. In this regard, each ratchet position on the strap is defined by a step 46 that faces toward the toggle body (when the strap is in its unstressed position) and below which a recess 48 is formed. In the illustrated embodiment, each recess 48 is formed by a part-spherical surface 50.

The locking sleeve 16 includes a collar 52 and an end flange 54, and the passage 44 is located in the end flange 54. The collar includes a strap guide recess 56 that is located between shoulders 58 and that is aligned with the passage 44. A flex tab 62 is located in the recess 56, with a projection 64 extending outward from the free end of the flex tab. The flex tab 62 connects to the collar only at its lower end 68, which allows for some flexing movement of the tab 58, per arrow 66. Notably, the projection 64 includes a step surface 70 that engages with the steps 46 of the strap to prevent movement of the locking sleeve along the strap away from the toggle body. The overall configuration of the projection 64 below the step is formed by a part-spherical surface 72, which will slide relatively smoothly over the part spherical surface portions 50 of the strap recesses 48 when the locking sleeve is moving toward the toggle body. The mating spherical shapes on the strap and the locking sleeve projection also provide for substantially sized step 46 and step surface 70 to provide the locking feature for the locking sleeve. Thus, the combination sphere feature on the sleeve and strap provides a smooth glide when pushing sleeve towards the toggle body and wall for tight fit of strap toggle to the wall, but the flat trailing surface of the sphere on the sleeve and strap prevents backwards movement and an effective lock. The locking sleeve 16 also includes a main through opening 45 for receiving a mounting fastener.

The toggle body 12 includes a wall boring end 80 for use in penetrating wallboard when the toggle body is rotated into the wallboard. In particular, the wall boring end 80 includes a pointed positioning tip 82 that initially engages the wallboard and a set of one or more blade projections 84 disposed about the positioning tip. The positioning tip 82 is formed by four stepped segments 82A-82D that are radially spaced apart from each other by ninety degrees and that angle toward and meet each other when moving toward the free end of the tip. The steps on the positioning tip may provide additional cutting edges for debris removal; and penetrating force reduction into the drywall. However, in alternative embodiments the steps may be eliminated (e.g., per the embodiment of FIGS. 29-30 below).

The positioning tip 82 initially enters the wall and stabilizes the toggle body position on the wall as the toggle body is rotated and the forward cutting edges 86A and side cutting edges 86B of the blade projections 84 begin to move into the wall during toggle body rotation. The blade projections 84 cut a clean hole in the wallboard and also scoop up dust during rotation (e.g., dust/particles can collect in pockets 87 during toggle body rotation into the wallboard), resulting in a wallboard hole without any flowering/drywall. The circular segment of wallboard that is cut by the boring end of the toggle body may be retained on the positioning tip 82 after the toggle body fully penetrates the wallboard.

Outward facing surface portions 88 of the blade projections 84 are all cylindrical and lie in a common circular cylindrical perimeter that runs parallel to the axis 20 of the toggle body, with the axis 20 positioned at the center of the common circular cylindrical perimeter. For the purpose of facilitating manual rotation of the toggle body 12 into wallboard, the toggle body include a finger recess 90 on the arcuate surface 92 of the toggle body and a thumb recess 94 on the generally flat or planar side 96 of the toggle body. The finger recess 90 includes opposed grip projections 98 that face each other and provide a more sure grip and leverage when a user grasps the toggle body using a thumb in recess 94 and index finger passing around the arcuate portion of the toggle body along and through the finger recess 90. The toggle body also includes a main through opening 95, which runs perpendicular to the body axis 20, for receiving a fastener.

The strap 14 includes a curved segment 110 that joins the main segment 18 to the short, small segment 22 to provide the L-shape. The curved segment is made sufficiently flexible to allow the main segment 18 to be folded down and held alongside the short segment 22 so that the main segment 18 also runs generally parallel with the toggle body axis 20 (per FIGS. 23-26 described below). However, the curved segment 110 is also sufficiently rigid such that when the main segment is released it will automatically move back to the position extending substantially perpendicular to the axis 20 of the toggle body. In the illustrated embodiment, this combination of flexibility and return rigidity is achieved in part by providing a strap thickness (designated TCS in FIG. 8) that is smaller than the thickness of the main strap segment 18 or the small strap segment 22. In addition, the curved segment 110 joins the small segment 22 at a height below the top surface 112 of the small segment 22, such that the upper portion of the small segment acts a limit on how tight the bend in the curved segment will be when the main segment 18 is folded down and held alongside the short segment 22, reducing the chance of strap breakage during the bend.

Figure 21:
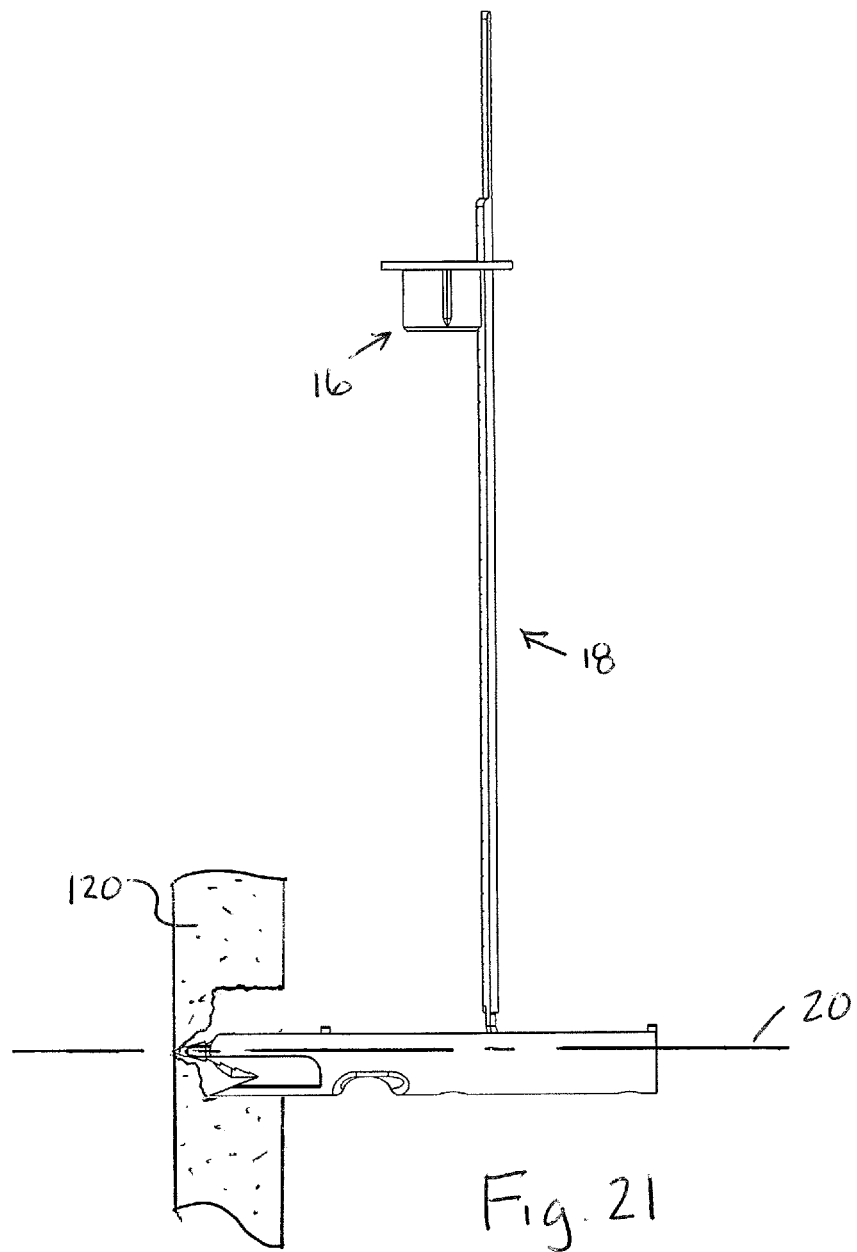
Figure 22:
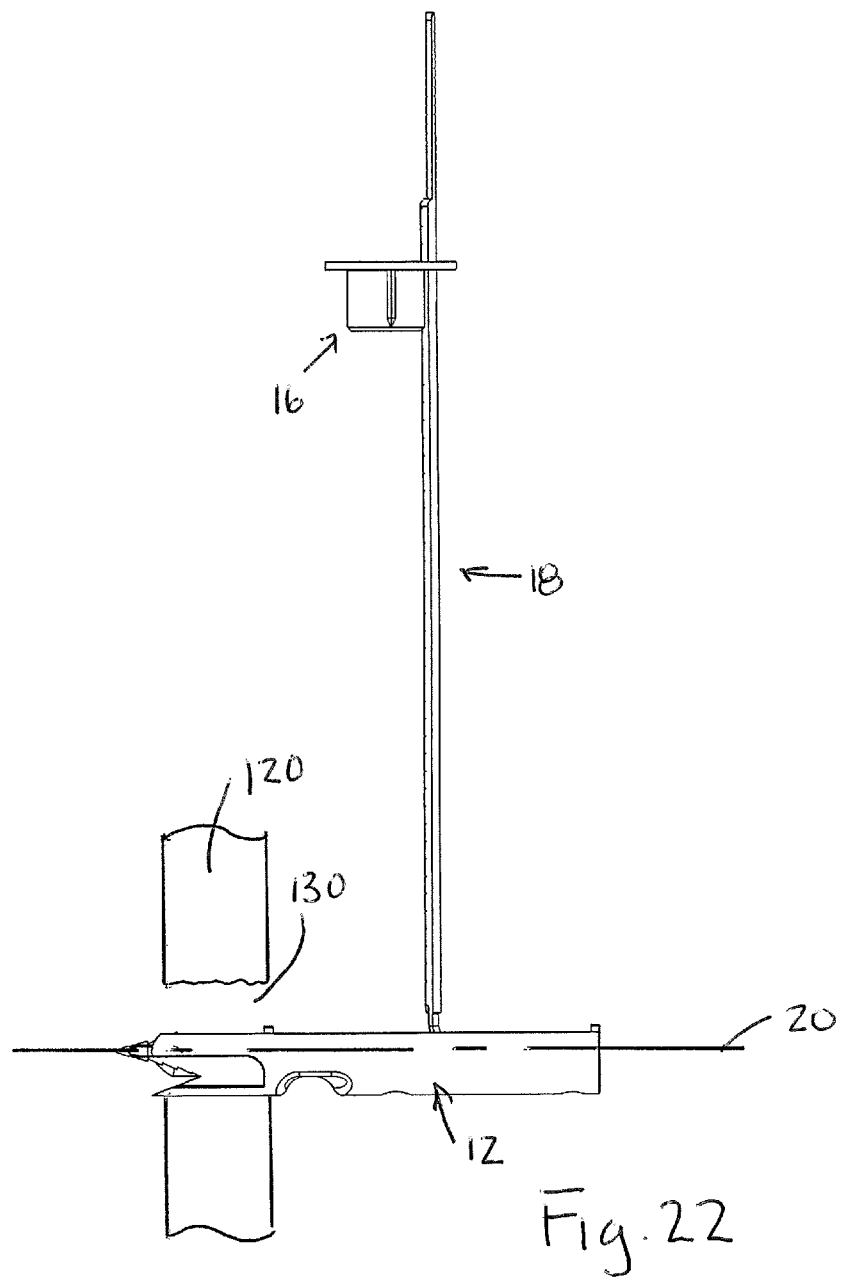
Figure 23:
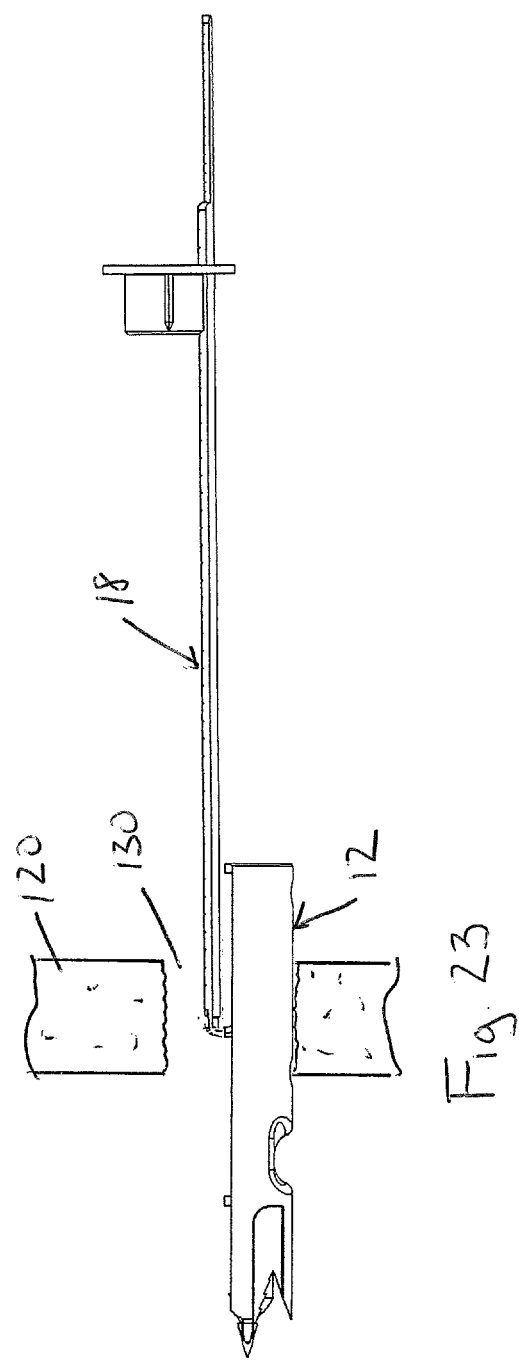
Figure 24:
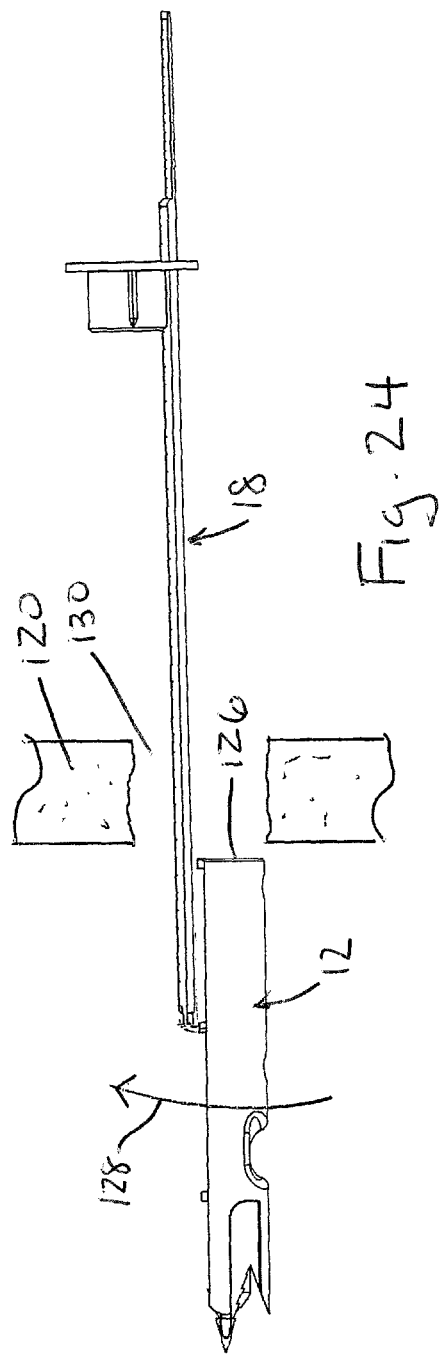
Figure 25:
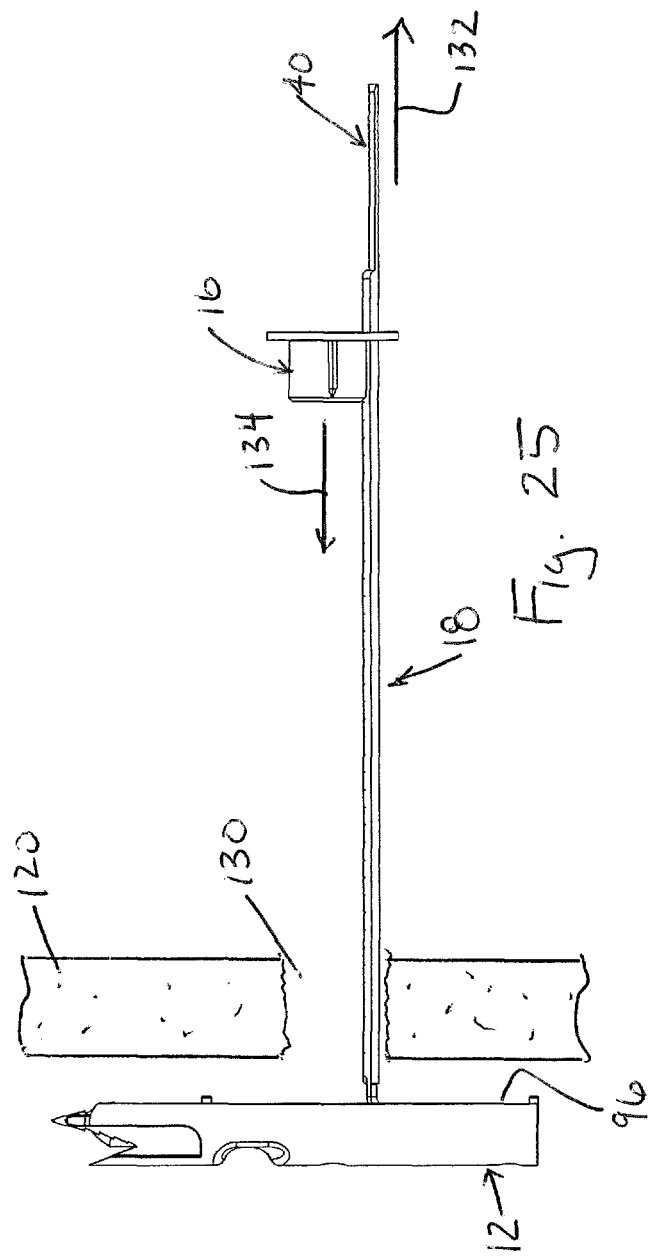
Figure 26:
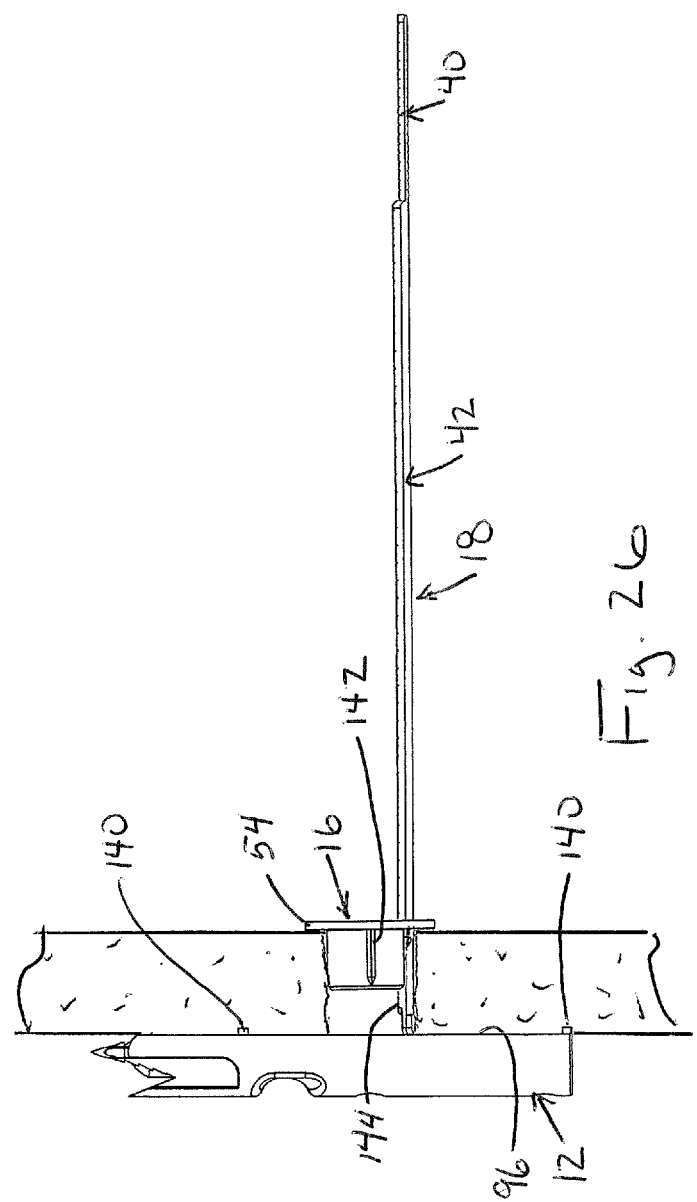

Referring now to FIGS. 20-28, a sequence of anchor install is described. Per FIG. 20, the toggle body 12 is placed substantially perpendicular to a wall 120, with the positioning tip 82 on the wall surface. The toggle body is then pushed toward the wall per arrow 122 to move the tip into wall and rotated clockwise per arrow 124 (e.g., while being gripped with thumb and index finger as described above) so that the blade projections 84 will cut the wall material. FIGS. 21 and 22 show the continuing sequence of boring a hole 130 in the wall with continued rotation of, and applied force on the toggle body 12. Once a complete hole 130 is formed in the wall 120, per FIG. 22, the main strap segment 18 is manually folded down, per FIGS. 23-24, so that the entire toggle body can be pushed through the hole 130. Once end 126 of the toggle body clears the backside of the wall 120, the rigid memory and bias of the curved segment of the strap causes the toggle body to flip, per arrow 128, so that the toggle body automatically shifts to a position parallel to the backside of the wall 120 as shown in FIG. 25. The grip end 40 of the strap is then used to pull the toggle body toward the wall per arrow 132 and the locking sleeve 16 is pushed along the strap toward the wall per arrow 134. This operation results in the flat side 96 of the toggle body 12 seating against the back surface of the wall and the locking collar 16 moving into the hole until the collar flange 54 seats against the front surface of the wall, as shown in FIG. 26. Notably, the flat side 96 of the toggle body includes a set of projecting spikes 140 that bite into the wall 120 and provide stability to prevent the toggle body from spinning against the wall, and the locking collar 16 includes diametrically opposite and radially outwardly projecting wings 142 that bite into the wall within the hole 130 to prevent collar spinning and increase shear strength. The protruding portion of the main strap segment 18 is then broken away, but a small portion 144 of the strap within the wall hole continues to hold the toggle body 12 to the locking sleeve 16. The axial length of the locking sleeve body can be made to closely match the thickness of the wall in order to provide most effective shear support in the wall. For example, the length of collar 52 may be substantially ⅜ inch or ½ inch for securing within ⅜ or ½ inch drywall respectively.

Figure 27:
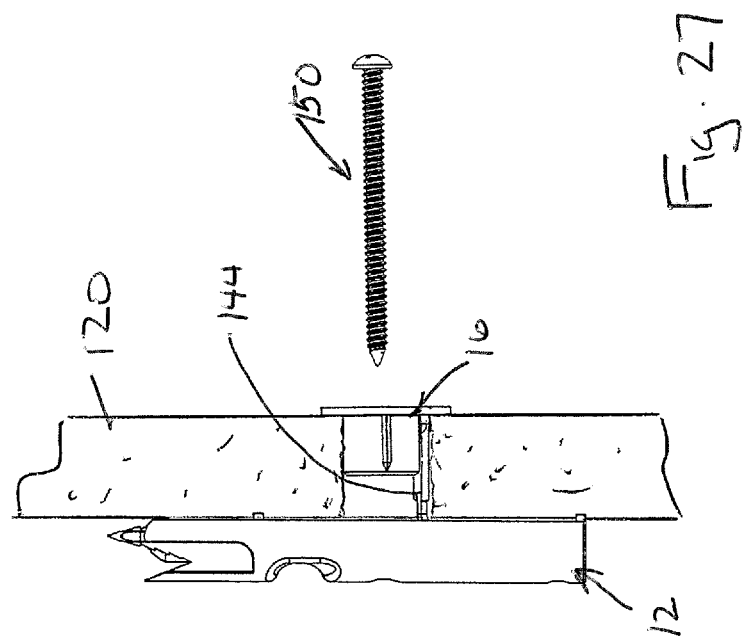
Figure 28:
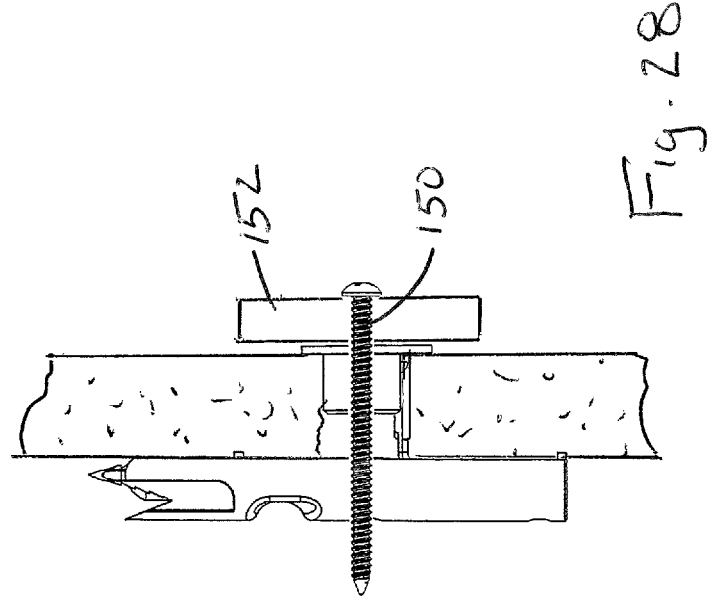

Per FIGS. 27 and 28, a screw or bolt 150 can then be used to secure an item 152 on the wall by rotating the screw through the main opening 45 of the locking sleeve and into threaded engagement with the main opening 95 of the toggle body. Notably, the positioning of the strap on the toggle body assures that the main opening 95 aligns with the wall hole 130 and the main opening of the locking sleeve 16. The main opening 45 may be pre-threaded to receive the fastener or may be splined or may be sized such that threads are formed in the opening by the action of the fastener.

Figure 29:
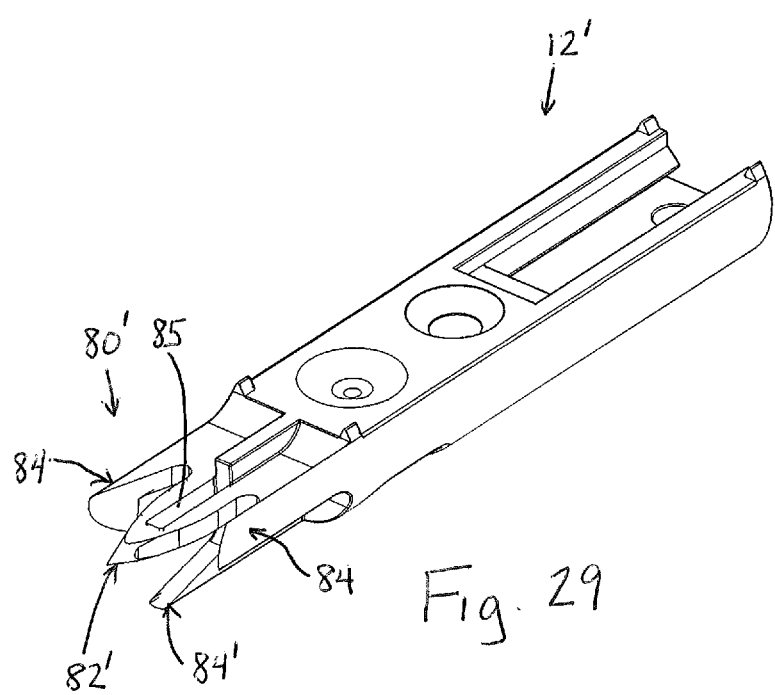
FIGS. 29-30 show perspective views of an alternative toggle body configuration.
Figure 30:
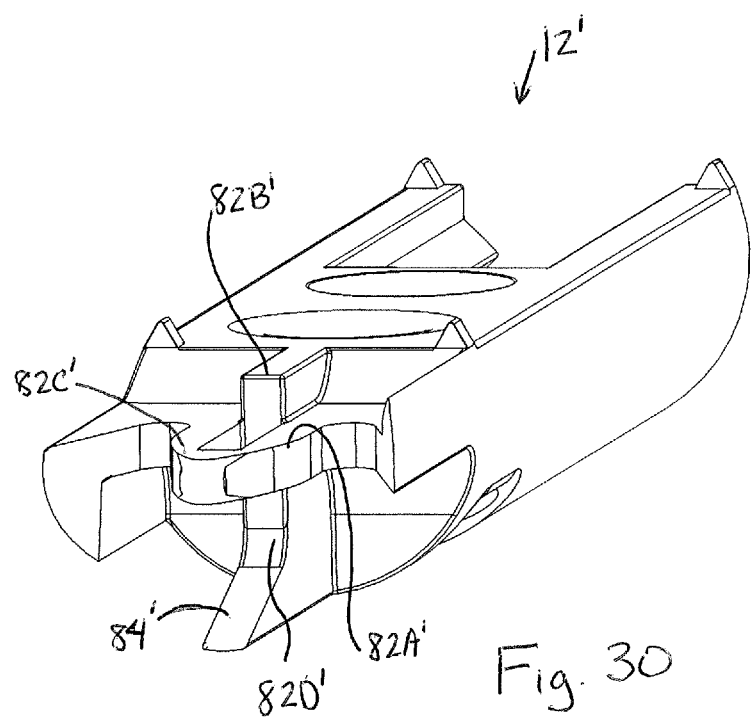
Figure 31:
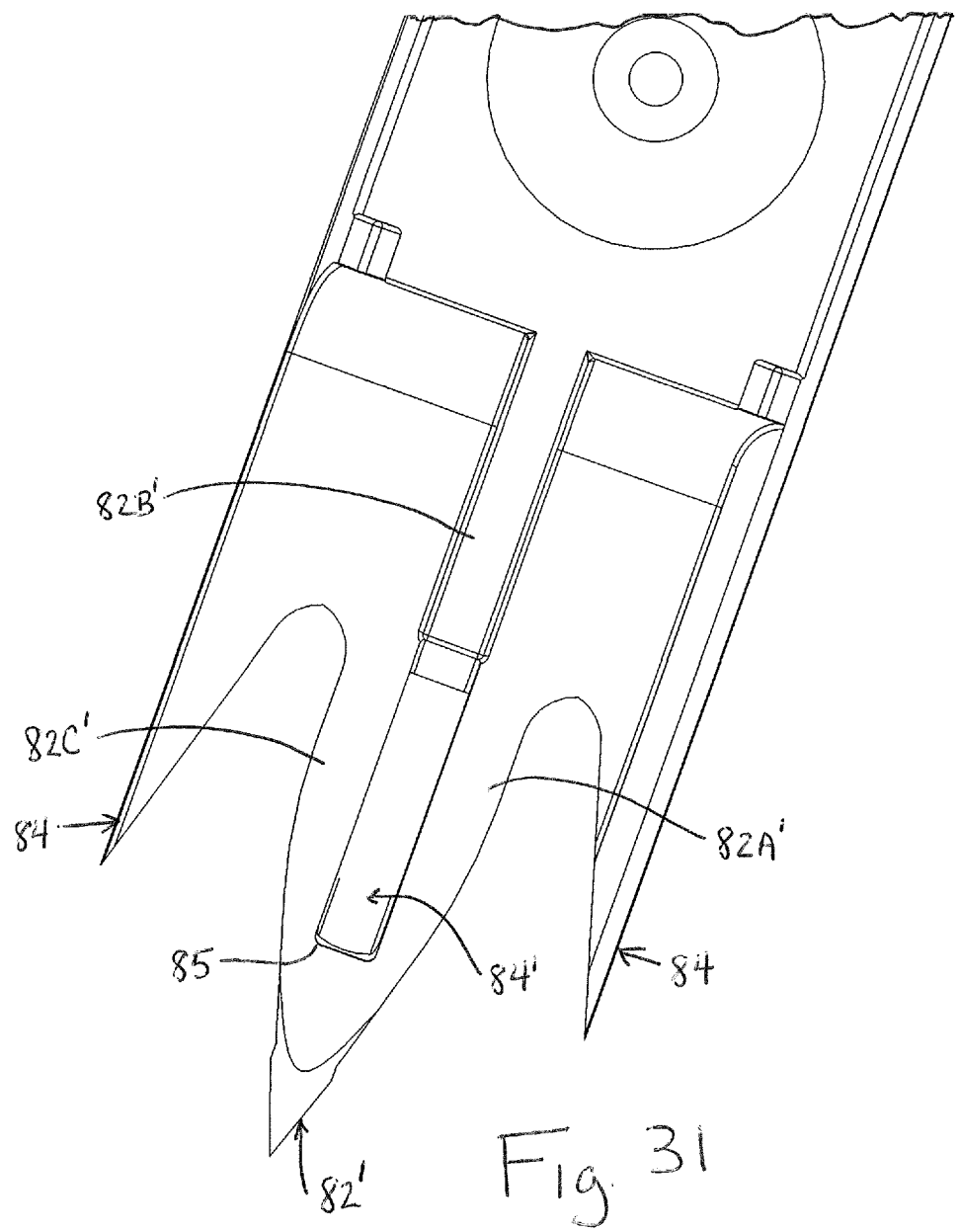
FIG. 31 shows a partial top plan view of the toggle body of FIGS. 29-30.

It is to be clearly understood that the above description is intended by way of illustration and example only, is not intended to be taken by way of limitation, and that other changes and modifications are possible. For example, FIGS. 29-31 show an alternative embodiment of a toggle body 12' that is similar in many respects to toggle body 12, but with a variation at the wall boring end 80'. In particular, the positioning tip 82' is formed primarily by two opposite segments 82A' and 82C'. Segments 82B' and 82D' do not extend all the way to the point of the tip. Moreover, segments 82A' and 82C' do not include any steps and, instead, generally curve toward the point of the tip. This configuration results in a slot 85 being formed on the tip, where the slot 85 aligns with a central blade projection 84', which facilitates simultaneous molding of the positioning tip 82' and the central blade projection 84'. Side blade projections 84 are also provided. Still other variations and configurations are possible.

What is claimed is:

1. An anchor assembly for wall installation, comprising:
   a toggle body that is elongated along an axis;
   a strap connected to and extending from the toggle body, wherein the strap includes a main segment that extends in a first direction away from the axis of the toggle body when the strap and toggle body are in an unstressed state, and the main segment is bendable down toward the toggle body such that the main segment extends in a second direction, where the second direction runs more closely to parallel with the axis than does the first direction;
   a locking sleeve mounted for movement along the strap toward the toggle body;
   wherein the strap is substantially L-shaped and includes a small segment extending laterally relative to the main segment, wherein the small segment is seated within a strap recess on the toggle body, wherein the small segment and the strap recess are collectively configured such that the small segment is engageable with the strap recess by sliding in a direction along the axis of the toggle body;
   wherein the strap recess includes a portion with a retaining profile in axial end view and the small segment includes a mating retaining profile that slides into the retaining profile along the axis of the toggle body;

wherein a bottom of the strap recess includes an opening, wherein a bottom of the small segment of the strap includes a projection, wherein the projection snaps into the opening to prevent the small segment from sliding axially out of the strap recess.

2. The anchor assembly of claim 1, wherein the main segment of the strap and the locking sleeve include a cooperating ratchet feature formed by part spherical recesses along the main segment and a part spherical projection on the locking sleeve that fits within the part spherical recesses.

3. The anchor assembly of claim 2, wherein a side of each part spherical recess facing toward the toggle body is formed by a substantially planar step, wherein the projection includes a substantially planar step surface facing away from the toggle body, and wherein the projection is formed on a flex tab of the locking sleeve.

4. The anchor assembly of claim 1, wherein the toggle body includes a wall boring end formed by a positioning tip and a set of blade projections disposed about the positioning tip.

5. The anchor assembly of claim 4, wherein at least one blade projection includes a forward cutting edge and a side cutting edge.

6. The anchor assembly of claim 5, wherein at least one pocket is formed between the positioning tip and at least one of the blade projections for capture of wall debris during wall boring.

7. The anchor assembly of claim 4, wherein the positioning tip is formed by a plurality of stepped segments that are radially spaced apart from each other and that angle toward and meet each other when moving toward a free end of the positioning tip.

8. The anchor assembly of claim 4, wherein the positioning tip is formed by a plurality of curved segments that are radially spaced apart from each other and that curve to meet each other toward a free end of the positioning tip, and a through slot is formed in the positioning tip rearward of the free end.

9. The anchor assembly of claim 8, wherein at least one blade projection aligns with the slot.

10. An anchor assembly for wall installation, comprising:
a toggle body that is elongated along an axis;
a strap connected to and extending from the toggle body, wherein the strap includes a main segment that extends in a first direction away from the axis of the toggle body when the strap and toggle body are in an unstressed state, and the main segment is bendable down toward the toggle body such that the main segment extends in a second direction, where the second direction runs more closely to parallel with the axis than does the first direction;
a locking sleeve mounted for movement along the strap toward the toggle body; wherein the strap is substantially L-shaped and includes a small segment extending laterally relative to the main segment, wherein the small segment is seated within a strap recess on the toggle body;
wherein the strap recess includes a portion with a retaining profile in axial end view and the small segment includes a mating retaining profile that slides into the retaining profile;
wherein the retaining profile is a dovetail profile and the mating retaining profile is a mating dovetail profile.

11. An anchor assembly for wall installation, comprising:
a toggle body that is elongated along an axis;
a strap connected to and extending from the toggle body, wherein the strap includes a main segment that extends in a first direction away from the axis of the toggle body when the strap and toggle body are in an unstressed state, and the main segment is bendable down toward the toggle body such that the main segment extends in a second direction, where the second direction runs more closely to parallel with the axis than does the first direction;
a locking sleeve mounted for movement along the strap toward the toggle body; wherein the strap is substantially L-shaped and includes a small segment extending laterally relative to the main segment, wherein the small segment is seated within a strap recess on the toggle body, wherein the small segment and the strap recess are collectively configured such that the small segment is engageable with the strap recess by sliding in a direction along the axis of the toggle body;
wherein the toggle body includes a substantially flat side at which the strap recess is formed, with a thumb recess formed as a depression in a surface of the flat side, and an arcuate side with a finger recess formed therein, where the finger recess and the thumb recess are aligned along the axis of the toggle body.

12. The anchor assembly of claim 11, wherein the substantially flat side includes a set of spike projections thereon for stabilizing the toggle body against a wall surface.

13. An anchor assembly for wall installation, comprising:
a toggle body that is elongated along an axis;
a strap connected to and extending from the toggle body, wherein the strap includes a main segment that is movable between a first orientation extending away from the axis of the toggle body and a second orientation running alongside the toggle body;
a locking sleeve mounted for movement along the strap toward the toggle body;
wherein the main segment of the strap and the locking sleeve include a cooperating ratchet feature formed by part spherical recesses along the main segment and a part spherical projection on the locking sleeve that fits within the part spherical recesses.

14. The anchor assembly of claim 13, wherein a side of each part spherical recess facing toward the toggle body is formed by a substantially planar step, wherein the projection includes a substantially planar step surface facing away from the toggle body, and wherein the projection is formed on a flex tab of the locking sleeve.

15. An anchor assembly for wall installation, comprising:
a toggle body that is elongated along an axis;
a strap connected to and extending from the toggle body, wherein the strap includes a main segment that is movable between a first orientation extending away from the axis of the toggle body and a second orientation running alongside the toggle body;
a locking sleeve mounted for movement along the strap toward the toggle body;
wherein the toggle body includes a substantially flat side with a thumb recess formed therein, the thumb recess formed by a depression in a surface of the substantially flat side, and an arcuate side with a finger recess formed therein, where the finger recess and the thumb recess are aligned along the axis of the toggle body, wherein the finger recess extends in a direction across the axis of the toggle body.

16. The anchor assembly of claim 15, wherein the substantially flat side includes a set of spike projections thereon for stabilizing the toggle body against a wall surface.

17. The anchor assembly of claim 15, wherein the finger recess is formed as a depression in a surface forming the arcuate side.

\* \* \* \* \*